United States Patent
Maguin

(10) Patent No.: US 10,428,815 B2
(45) Date of Patent: Oct. 1, 2019

(54) PUMP FOR CONVEYING A LIQUID

(71) Applicant: CONTINENTAL AUTOMOTIVE GMBH, Hannover (DE)

(72) Inventor: Georges Maguin, Marly (FR)

(73) Assignee: Continental Automotive GmbH, Hannover (DE)

(*) Notice: Subject to any disclaimer, the term of this patent is extended or adjusted under 35 U.S.C. 154(b) by 132 days.

(21) Appl. No.: 15/312,469

(22) PCT Filed: Jun. 1, 2015

(86) PCT No.: PCT/EP2015/062058
§ 371 (c)(1),
(2) Date: Feb. 3, 2017

(87) PCT Pub. No.: WO2015/189057
PCT Pub. Date: Dec. 17, 2015

(65) Prior Publication Data
US 2017/0138358 A1 May 18, 2017

(30) Foreign Application Priority Data

Jun. 12, 2014 (DE) .......... 10 2014 108 253

(51) Int. Cl.
*F04C 5/00* (2006.01)
*F01N 3/20* (2006.01)
(Continued)

(52) U.S. Cl.
CPC ............ *F04C 5/00* (2013.01); *F01C 21/08* (2013.01); *F01N 3/206* (2013.01); *F01N 3/2066* (2013.01);
(Continued)

(58) Field of Classification Search
CPC .............. F04C 5/00; F04C 2220/24; F04C 2210/1083; F04C 2240/30; F04B 43/123;
(Continued)

(56) References Cited

U.S. PATENT DOCUMENTS 2,123,781 A 7/1938 Huber
2,946,291 A * 7/1960 Roebig .................. F04C 2/04
418/56
(Continued)

FOREIGN PATENT DOCUMENTS

CN 1292060 A 4/2001
CN 1578826 A 2/2005
(Continued)

OTHER PUBLICATIONS

International Search Report and Written Opinion dated Oct. 5, 2015 from corresponding International Patent Application No. PCT/EP2015/062058.

*Primary Examiner* — Audrey K Bradley

(57) ABSTRACT

Pump for conveying liquid, having at least one pump housing with at least one inlet and at least one outlet, and including an inner circumferential surface and a geometric axis, where an eccentric is arranged within the pump housing and is moveable eccentrically relative to the pump housing around the geometric axis. A deformable element is arranged in a pump gap between the inner circumferential surface of the pump housing and an outer surface of the eccentric. The deformable element is pressed against the pump housing by the outer surface of the eccentric along at least one section of a conveying channel such that at least one displaceable seal of the conveying channel and at least one closed pump volume are formed in the conveying channel which are displaceable by an eccentric movement of
(Continued)

the eccentric for conveying the fluid along the conveying channel from the inlet to the outlet.

7 Claims, 6 Drawing Sheets

(51) Int. Cl.
*F04B 43/12* (2006.01)
*F01C 21/08* (2006.01)

(52) U.S. Cl.
CPC ........ *F04B 43/123* (2013.01); *F01N 2610/02* (2013.01); *F01N 2610/1433* (2013.01); *F04C 2210/1083* (2013.01); *F04C 2220/24* (2013.01); *F04C 2240/30* (2013.01); *Y02A 50/2325* (2018.01); *Y02T 10/24* (2013.01)

(58) Field of Classification Search
CPC ........ F01C 21/08; F01N 3/206; F01N 3/2066; F01N 2610/02; F01N 2610/1433; Y02T 10/24; Y02A 50/2325
See application file for complete search history.

(56) References Cited

U.S. PATENT DOCUMENTS

| | | | | |
|---|---|---|---|---|
| 5,988,998 A | * | 11/1999 | Glover | F04C 5/00 |
| | | | | 418/153 |
| 6,506,035 B1 | | 1/2003 | Beck et al. | |
| 9,453,507 B2 | * | 9/2016 | Ghodsi-Kameneh | |
| | | | | F01C 21/08 |
| 2007/0253835 A1 | * | 11/2007 | Habr | F04B 43/12 |
| | | | | 417/211 |
| 2010/0050610 A1 | * | 3/2010 | Toshioka | B01D 53/9409 |
| | | | | 60/286 |

FOREIGN PATENT DOCUMENTS

| | | | | |
|---|---|---|---|---|
| DE | 719161 | | 3/1942 | |
| DE | 719161 C | * | 3/1942 | ............. F04B 43/14 |
| DE | 2132193 A1 | | 1/1973 | |
| DE | 2853916 A1 | | 6/1980 | |
| DE | 2911609 A1 | | 9/1980 | |
| GB | 768253 A | | 2/1957 | |
| WO | 20120126544 A1 | | 9/2012 | |

* cited by examiner

PUMP FOR CONVEYING A LIQUID

CROSS-REFERENCE TO RELATED APPLICATIONS

This application claims the benefit of PCT Application PCT/EP2015/062058, filed Jun. 1, 2015, which claims priority to German Application DE 10 2014 108 253.2, filed Jun. 12, 2014. The disclosures of the above applications are incorporated herein by reference.

FIELD OF THE INVENTION

The invention relates to a pump for delivering a liquid. The pump may be used in particular in a motor vehicle for delivering a liquid additive for exhaust-gas purification from a tank into an exhaust-gas treatment device.

BACKGROUND OF THE INVENTION

Exhaust-gas treatment devices in which a liquid additive is required are required for example for the SCR process. In the SCR (Selective Catalytic Reduction) process, nitrogen oxide compounds in the exhaust gas of an internal combustion engine are reduced, with the aid of ammonia, to form non-hazardous substances such as nitrogen, water and $CO_2$. The ammonia for the SCR process is normally produced from a liquid ammonia precursor solution which is stored in a tank and which may be delivered from the tank to the exhaust-gas treatment device by means of the described pump. The liquid ammonia precursor solution is also referred to as liquid additive, as reducing agent or as reducing agent precursor. The liquid is preferably urea-water solution. What is particularly preferable is a urea-water solution with a urea content of about 32.5%, which is available under the trade name AdBlue®. The liquid is converted to ammonia outside the exhaust gas (in a reactor provided for the purpose) and/or in the exhaust gas (in the exhaust-gas treatment device).

A problem in the case of pumps for the delivery of such liquids is that these liquids may freeze at low temperatures. The described 32.5% urea-water solution, for example, freezes at −11° C. In motor vehicles, such low temperatures may arise in particular during long standstill phases in winter. Liquid expands as it freezes. Either the pump must be designed such that it is not damaged by freezing liquid, or an evacuation of the pump must take place if low temperatures are encountered. In order that a pump may be evacuated, it is generally necessary that the pump also generates air flow.

In particular in the case of a urea-water solution as liquid, it is also a problem that, for example, crystalline urea deposits may form or gaseous ammonia may be excreted, which may influence the operation of the pump. Crystalline urea deposits may influence components of the pump through friction, and cause material abrasion on the components of the pump.

Pumps for delivering such liquids to an exhaust-gas treatment device should preferably also be capable of delivering the liquid to the exhaust-gas treatment device in as precisely dosed a fashion as possible. This makes it possible to dispense with additional measures for dosing the liquid. Additional measures for dosing are for example dosing valves by means of which the dosing may be performed in a time-controlled manner (by way of the opening time of the dosing valve). Dosing by means of the pump is often significantly more accurate than dosing valves of this type.

The pump should furthermore have the highest possible mechanical efficiency, such that the least possible energy is required for the delivery and dosing of the liquid and, at the same time, the least possible heating of the pump occurs.

Documents U.S. Pat. Nos. 2,544,628, 3,408,947, DE 2 853 916 and DE 38 15 252 A1 disclose a pump type also referred to as an orbital pump. This type of pump is relatively resistant to a volume expansion of a liquid when the latter freezes.

Secondly, this type of pump may also be operated in a reverse delivery direction, such that an evacuation of a delivery module is possible in a technically simple manner. It is however necessary for this type of pump to be adapted to the requirements imposed by the SCR process. It is sought in particular to achieve an improvement of this type of pump with regard to dosing accuracy. This type of pump is problematic in particular with regard to efficiency and dosing accuracy because, a very large amount of mechanical energy is required to deform the diaphragm element, and the deformability of the diaphragm element may lead to dosing inaccuracy.

SUMMARY OF THE INVENTION

It is therefore an object of the present invention to propose a particularly advantageous pump for the delivery of a liquid, which pump at least partially solves the above problems and is in particular suitable for the delivery of liquid for exhaust-gas purification (in particular urea-water solution).

This object is achieved by means of a pump according to the features of patent claim 1. Further advantageous refinements of the pump are specified in the dependent patent claims. It is pointed out that the features presented in the individual patent claims may be combined with one another in any desired technologically meaningful way and may be supplemented by explanatory facts from the description, with further design variants of the pump being specified.

The invention describes a pump for the delivery of a liquid, having at least one pump housing with at least one inlet and at least one outlet and having an inner circumferential face and a geometric axis. Within the pump housing, there is arranged an eccentric which is movable in eccentric fashion relative to the pump housing about the geometric axis.

A deformable element is arranged in a pump gap between the inner circumferential face of the pump housing and an outer face of the eccentric, wherein a delivery duct is formed from the at least one inlet to the at least one outlet by the deformable element and by the inner circumferential face of the pump housing. Furthermore, the deformable element is pressed against the pump housing along at least one section of the delivery duct by the outer face of the eccentric such that at least one displaceable seal of the delivery duct and at least one closed pump volume are formed in the delivery duct, these being displaceable along the delivery duct from the inlet to the outlet by means of a rotation of the eccentric for the delivery of the liquid. Furthermore, the outer face of the eccentric has a structured surface.

A pump with this construction is also referred to as an orbital pump. The pump has a (central) geometric axis about which the eccentric may be moved in eccentric fashion. For this purpose, it is preferable for a drive shaft to extend along the drive axis, which drive shaft connects the eccentric to an (at least one electric) drive. For the description of the pump and of its components in spatial terms, a radial direction is hereinafter assumed which is perpendicular to the geometric axis of the pump and which extends outward in a radial direction proceeding from the geometric axis of the pump. Furthermore, for the description of the pump in spatial terms, a circumferential direction is assumed which is tangential to the geometric axis and tangential to the inner circumferential face of the pump housing. For the description of the pump, a central plane of the pump is also defined. The central plane is arranged perpendicular to the geometric axis and is spanned by the radial direction and the circumferential direction. The delivery duct extends at least in sections along the circumferential direction through the pump housing, or along the inner circumferential face of the pump housing, from the inlet to the outlet of the pump.

The pump housing, the eccentric, the deformable element and the delivery duct lie in the central plane, and the central plane preferably also forms a plane of symmetry for the pump housing, the eccentric and the deformable element. The inner circumferential face is preferably rotationally symmetrical relative to the geometric axis.

The pump housing of the pump is preferably constructed in the manner of a ring or a cylindrical chamber, inside which the eccentric is (internally) arranged. The pump housing may also be regarded as an (external) stator of the pump, wherein the eccentric may be referred to as an (internal) rotor. For a kinematic reversal, the invention is also intended to encompass constructions in which the pump housing with inlet and outlet is situated internally and the eccentric externally surrounds the pump housing, wherein then, the pump gap is situated between an outer circumferential face of the internally situated pump housing and an inner face of the eccentric. The structured surface which is to be defined in more detail below is, in the case of said kinematic reversal of the pump, arranged on the inner face of the eccentric. In the case of kinematic reversal of the pump, the pump housing may be referred to as an (internal) stator, or the eccentric may be referred to as an (external) rotor. The inlet and the outlet are arranged on the pump housing and permit the inflow and outflow of the liquid into the pump housing and into the delivery duct. The pump housing is preferably composed of plastic. The pump housing may however also be composed of metal, a metal-plastic composite material or any other desired material.

Here, the expression "eccentric" means in particular a circular structure which is arranged eccentrically (off-centre) with respect to the geometric axis.

The eccentric movement about the geometric axis may also be referred to as rotational movement (rotation). Two types of eccentric movements are basically possible. The first type of eccentric movement is a true rotation of the entire eccentric about the geometric axis. The second type of eccentric movement is a circular displacement of the eccentric and/or of the outer face of the eccentric. Both types of eccentric movement have the same influence on the spatial position of the outer face of the eccentric relative to the pump housing and on the deformation of the pump gap of the pump owing to the movement of the eccentric. During the true rotation of the entire eccentric, however, a rotation of the outer face of the eccentric additionally takes place, which does not occur in the case of the circular displacement.

The pump gap between the pump housing and the eccentric is in particular of annular, sickle-shaped or encircling form. The gap width of the pump gap is varied in each case in sections owing to the eccentric movement of the eccentric. The delivery duct is arranged (within the gap) in particular between the deformable element and the pump housing and is delimited by the pump housing and the deformable element. The pump gap has at least one constriction which is displaced in the circumferential direction along the pump housing or along the delivery duct owing to a rotation and/or the eccentric movement of the eccentric. At the constriction, the deformable element is pressed against the housing, such that the displaceable seal is formed. In the relaxed state, the deformable element preferably has a diameter which is at least exactly the same size as, or larger than, a diameter of the inner circumferential face of the pump housing. The pump gap arises in particular owing to the fact that the deformable element is inserted in the pump housing and is, in sections, pressed eccentrically against the pump housing with particularly great intensity by the eccentric. This has the effect that the pump gap is formed in particular oppositely with respect to an eccentricity of the eccentric. The formation of the pump gap is additionally assisted by the presence of liquid in the pump. The liquid compresses the deformable element in the pump housing, such that the actual diameter of the deformable element in the pump housing is smaller than the diameter in the relaxed state.

A distinction may be made between simplex eccentrics and multiplex eccentrics. Simplex eccentrics are eccentrics that form precisely one displaceable constriction and thus also precisely one displaceable seal. Simplex eccentrics preferably have a circular, in particular cylindrical, outer face. Also encompassed here are so-called "multiplex" eccentrics which form a multiplicity of constrictions of the pump gap and a multiplicity of displaceable seals. Such "multiplex" eccentrics may for example also be formed by a multiplicity of rollers which roll on the inside of the deformable element and form the constrictions. The surface of the rollers then forms the outer face of the eccentric. The structured surface described further above may then be arranged on the outer face of the rollers. A "multiplex" eccentric may also be formed with a cam disc, which may for example have an outer face of oval shape.

Between the pump housing and the deformable element, the delivery duct has a duct cross section through which liquid may flow, which duct cross section may for example (depending on the size of the pump) amount to between 1 mm$^2$ and 50 mm$^2$ at the largest point with the maximum spacing to the at least one displaceable seal. The inlet and the outlet are preferably arranged with an angular spacing of greater than 270° with respect to one another (measured in the central plane) in a delivery direction of the pump.

Counter to the delivery direction, the inlet and the outlet thus have an angular spacing of less than 90° with respect to one another.

The deformable element is preferably arranged between the eccentric and the pump housing in such a way that the eccentric presses the deformable element in regions or in sections against or onto the circumferential surface of the pump housing such that the at least one displaceable seal is thereby formed. At the seal, there is (linear or areal) contact between the deformable element and the inner circumferential face of the pump housing, which has the effect that the liquid cannot flow through. In other words, in the region of the displaceable seal, the deformable element bears fully against the pump housing, such that, in the region of the displaceable seal, the duct cross section no longer has cross-sectional area through which flow can pass. The delivery duct is accordingly blocked in the region of the displaceable seal. It is thus also the case that at least one closed pump volume is formed within the delivery duct. The reference to a closed pump volume means that there is a section of the delivery duct which is closed off at least on one side (upstream or downstream along the delivery duct). By means of a displacement of the displaceable seal, the at least one closed pump volume is also displaced, such that the liquid situated in the closed pump volume is delivered. It is preferable if, during the operation of the pump, multiple closed pump volumes are displaced from the inlet of the pump to the outlet of the pump in order to deliver the liquid. In this way, a closed pump volume is created (meaning closed off at least on one side) in the vicinity of the inlet and is then eliminated (meaning opened again at least on one side) at the outlet. At the inlet, a closed pump volume is closed by a displaceable seal (only) on one side, in a downstream direction, and is connected in an upstream direction to the inlet, such that the liquid may flow through the inlet into the closed pump volume. At the outlet, the closed pump volume is (still) closed off by a seal (only) on one side, this being in an upstream direction, and the closed pump volume is connected in a downstream direction to the outlet, such that the liquid may flow through the outlet out of the closed pump volume. In between (on the path of the closed pump volume from the inlet to the outlet), there is a phase in which the closed pump volume is closed off by the at least one displaceable seal in the upstream and downstream directions (at both sides). If only a single displaceable seal is provided, the one displaceable seal is then positioned such that both the inlet and also the outlet are closed off.

The deformable element may also be referred to as a deformable diaphragm. Here, the expression "diaphragm" does not imperatively specify whether the deformable element has an areal extent. The expression "diaphragm" should be understood as an indication that the deformable element is a flexible structure which may be deformed for the purpose of delivering the liquid and which is suitable for forming the at least one displaceable seal and the at least one displaceable pump volume together with the pump housing. As material for the deformable element or the deformable diaphragm, use is preferably made of an elastomer (for example natural rubber or latex). To increase the durability and/or to establish and maintain the flexibility, the material of the deformable element may include additives. The deformable element is preferably flexible in all directions (in the axial direction, in the radial direction and in the circumferential direction). It is however also possible for the deformable element to exhibit partially directional flexibility. The deformable element may for example exhibit greater flexibility in the radial direction than in the circumferential direction and in the axial direction. The deformation of the deformable element in one direction typically also causes a deformation in the other direction. The deformable element expands for example in the axial direction and/or in the circumferential direction when compressed in the radial direction.

On the pump, there is preferably provided a static seal which prevents an undesired (direct) backflow of the liquid from the outlet to the inlet (counter to the delivery direction). The static seal may be provided so as to be positionally fixed with the pump housing. The static seal is normally positioned (in a positionally fixed manner) between the outlet and the inlet. The deformable element may, in the region of the static seal, for example, be clamped or adhesively bonded to the pump housing so as to permanently ensure a fluid-tight seal between the pump housing and the deformable element. The static seal exhibits fluid-tight properties regardless of the position of the eccentric.

The pump preferably furthermore has in each case one (annular and static) axial seal on both sides of the central plane of the pump in the axial direction, which axial seals provide sealing between the pump housing and the deformable element and thus delimit the delivery duct to the sides. There are thus preferably two (annular) axial seals. The radial seals may for example be realized by clamping and/or abutment of the deformable element against the pump housing. It is preferable for both axial seals to merge directly into the static seal. It may thus be ensured that no leakage from the outlet back to the inlet takes place at the static seal.

The pump is preferably designed for a delivery of liquid in the delivery direction from the inlet to the outlet. If appropriate, a reversal of the delivery direction (from the outlet to the inlet rather than from the inlet to the outlet) is also possible by means of a reversal of the direction of the eccentric (rotational) movement of the eccentric.

The structured surface of the outer face of the eccentric may also be referred to as a structure or a profile. The structured surface is distinguished in particular by the fact that it forms a microstructure of the surface of the eccentric, wherein a structured depth is preferably at least 1 mm (millimeter). The structured surface or the profile of the structure are to be distinguished in particular from the eccentricity of the eccentric. The eccentricity of the eccentric forms a macrostructure of the outer face of the eccentric which forms a continuous narrowing of the pump gap toward the constriction and toward the displaceable seal and a continuous widening of the pump gap away from the constriction and away from the displaceable seal. By contrast, the structured surface or the profile of the structure forms a microstructure of the outer face of the eccentric. The structured surface has the effect that the pump gap has, at all locations (both in the region of the constriction at the displaceable seal and also in all other regions), a width that rapidly changes along the circumferential direction. The structured surface of the outer face of the eccentric has the effect that the deformable element is supported by the outer face of the eccentric only in sections. It has been found that, by means of such a structured surface on the outer face of the eccentric, the friction forces in the pump and in particular in the deformable element may be significantly reduced. In this way, a drive torque that is required for the eccentric movement of the eccentric is reduced considerably.

The pump is particularly advantageous if, owing to the structured surface in the region of the displaceable seal, there exists in the deformable element a pressure distribution which, along the delivery duct, forms at least one local pressure maximum and at least one local pressure minimum.

A local pressure maximum and a local pressure minimum means in each case that, to the sides of the pressure maximum and of the pressure minimum, respectively, in the circumferential direction, the pressure in the deformable element is respectively lower and higher. The pressure in the deformable element at the displaceable seal arises because the deformable element is compressed in the region of the displaceable seal by the eccentric. The pressure in the deformable element is typically at its greatest in the centre of the displaceable seal as defined in the circumferential direction. The structured surface of the outer face has the effect that an undulation of the pressure distribution in the deformable element is superposed on the displaceable seal. It is preferable for multiple (or even a multiplicity) of pressure maxima and pressure minima to exist in the deformable element along the displaceable seal in the circumferential direction. The pressure maxima and the pressure minima are preferably positionally fixed in the circumferential direction. During a displacement of the displaceable seal, the pressure at the pressure maxima and at the pressure minima decreases downstream of the displaceable seal in the delivery direction, whereas the pressure at pressure maxima and pressure minima increases upstream of the displaceable seal in the delivery direction. The pressure at the pressure maxima and the pressure minima is at its greatest in the centre of the displaceable seal in the circumferential direction.

During the displacement of the displaceable seal, deformation energy must be imparted in order to deform the deformable element. During the compression of the deformable element, the deformation energy is mechanically introduced into the deformable element in the downstream region of the static seal and partially converted already into heat. During the expansion of the deformable element in the upstream region of the static seal, residual deformation energy mechanically stored in the deformable element is also released as heat.

It is preferred if the structured surface is designed such that the pressure in the deformable element at a local pressure minimum is higher than a predetermined maximum operating pressure of the pump.

The maximum operating pressure is the maximum pressure that may be output by the pump at the outlet. The maximum operating pressure is normally in a range between 3 and 8 bar and is defined by the specifications of the pump. Through suitable configuration of the structured surface or of the profile, it may be achieved that the pressure in the deformable element at a local pressure minimum never falls below the predetermined maximum operating pressure (regardless of the position of the displaceable seal along the delivery duct). It is achieved in this way that a backflow of the liquid is always prevented by the static seal.

The pump is furthermore advantageous if the eccentric has an outer bearing ring and an inner eccentric region, wherein, between the outer bearing ring and the inner eccentric region, there is arranged a bearing by means of which an eccentric rotational movement of the inner eccentric region is converted into an eccentric circulating movement of the outer bearing ring, and the outer face with the structured surface is arranged on the outer bearing ring.

The bearing is preferably a ball bearing, a needle bearing or a roller bearing. The inner eccentric region of the eccentric performs a rotational movement about the axis during operation. For this purpose, the inner eccentric region is connected to the drive of the pump via a drive shaft. The eccentric arrangement, and if appropriate also the external shape of the eccentric, result(s) in an eccentric circulating movement of the outer face of the eccentric as a result of the eccentric rotational movement of the inner eccentric region. The eccentric movement is transmitted to the outer bearing ring. By means of a bearing between the inner eccentric region and the outer bearing ring, an eccentric rotational movement of the inner eccentric region may be converted into an eccentric circulating movement of the outer bearing ring without the rotational movement component of the movement of the inner eccentric region also being transmitted to the outer bearing ring. The fact that the movement of the outer bearing ring does not have a rotational movement component makes it possible for shear stresses in the deformable element and internal friction forces of the pump to be reduced. The deformable element is (merely) flexed owing to the movement of the eccentric. It is preferable for "only" pressure forces and substantially no friction forces to act on the outer face of the eccentric at a contact surface of the eccentric, or the outer bearing ring, and of the deformable element. A corresponding division of the eccentric into an inner eccentric region and an outer bearing ring is also possible, for a kinematic reversal, if the eccentric is an external rotor arranged around an (inner) pump housing.

In one embodiment, an outer bearing ring of the eccentric is rotationally fixed relative to the pump housing.

The structured surface arranged on the outer face of the eccentric at the outer bearing ring is thus likewise positioned rotationally fixedly relative to the pump housing. Thus, local pressure maxima and local pressure minima induced in the deformable element in the region of the displaceable seal by the structured surface are not displaced as a result of a movement of the eccentric. To make the outer bearing ring rotationally fixed relative to the pump housing, the outer bearing ring may be connected to the pump housing. A connection may be made for example to the static seal.

The pump is furthermore advantageous if the structured surface comprises an undulation which is oriented parallel to the geometric axis and which has undulation peaks and undulation troughs.

By means of such a structured surface, local pressure maxima and local pressure minima which are arranged in each case perpendicular to the delivery duct exist in the deformable element. It has been found that such an undulation results in particularly good sealing of the delivery duct, and at the same time the expenditure of energy for the deformation (deformation energy) of the deformable element during the displacement of the displaceable seal is reduced to a particularly great extent. The undulation peaks and the undulation troughs preferably extend in the axial direction over the entire width of the eccentric or of the deformable element.

The outer face of the eccentric preferably has a cylindrical basic shape which is divided in regions by the structured surface. This is advantageous for all of the structured surfaces disclosed. For a structured surface designed with an undulation, this means that the undulation is formed (only) by way of depressions in a cylindrical basic shape of the outer face, and no elevations exist that extend beyond the cylindrical basic shape of the outer face.

In one embodiment, the undulation peaks of the undulation have a spacing to one another which is smaller than an extent of the displaceable seal in a circumferential direction along the delivery duct, such that, by means of the undulation peaks, at least two local pressure maxima are formed in the displaceable seal along the delivery duct.

It is preferable for the spacing of the undulation peaks of the undulation to even be considerably smaller than the extent of the displaceable seal in the circumferential direction along the delivery duct. The spacing is preferably 10 times or even 20 times smaller. A particularly uniform distribution of pressure maxima and pressure minima in the deformable element in the region of the displaceable seal may be achieved in this way.

In another embodiment, the structured surface includes a pattern of depressions of the outer face, wherein the depressions are delimited in each case in encircling fashion.

By means of such a (geometric and/or repeating) pattern, the deformation energy for the deformation of the deformable element in the region of the displaceable seal, and thus the torque required for the movement of the eccentric, may likewise be reduced in an effective manner.

It is furthermore advantageous for the structured surface to comprise a golf ball surface of the outer face.

A golf ball surface is formed in each case by approximately hemispherical depressions in the outer face, which depressions form a regular pattern. The required deformation energy and the required torque may likewise be reduced in an effective manner by means of such a pattern.

It is particularly advantageous for the structured surface of the eccentric to be formed with smooth transitions, such that notch forces, such as may arise in particular at the contact points between the deformable element and the eccentric in the deformable element, are eliminated.

It is furthermore preferable if the structured surface of the outer face of the eccentric of the pump includes a smooth angle segment about the geometric axis, wherein the angle segment covers at least the inlet or the outlet.

The outer face does not need to have a structured surface in the region of the angle segment. The outer face is thus not structured, or is smooth, in the angle segment. In particular, an undulation that forms the structured surface, or a pattern of depressions that forms the structured surface, with the exception of the region of the angle segment. By means of the area of the structured surface in an angle segment that covers the inlet and the outlet of the pump, it is ensured that the liquid flow in the pump is not interrupted in the region of the inlet and of the outlet. As already stated further above, the eccentric is preferably rotationally fixed relative to the pump housing, such that that angle segment of the eccentric which does not have a structured surface may be positioned permanently relative to the inlet and relative to the outlet such that the inlet and the outlet are covered by the angle segment. At the same time, however, the torque required for driving the eccentric is nevertheless reduced owing to the structured surface in the region outside the angle segment.

The angle segment is preferably smaller than 90° and particularly preferably at the same time larger than 50°. The structured surface then extends over a remaining angle, outside the angle segment, of between 270° and 310°.

Also proposed is a motor vehicle, having an internal combustion engine, an exhaust-gas treatment device for the purification of the exhaust gases of the internal combustion engine, and a pump as described herein, where the pump is designed to deliver a liquid additive for exhaust-gas purification from a tank to an injector, by means of which the liquid additive may be supplied to the exhaust-gas treatment device.

The exhaust-gas treatment device preferably includes an SCR catalytic converter in which the SCR process may be implemented by way of the liquid additive (for example urea-water solution) that is delivered by the pump.

The invention and the technical field will be explained in more detail below on the basis of the figures. It should be noted that the figures describe particularly preferred embodiment variants of the invention, to which the invention is however not restricted. In particular, it should be noted that the figures and in particular the proportions illustrated in the figures are merely schematic.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
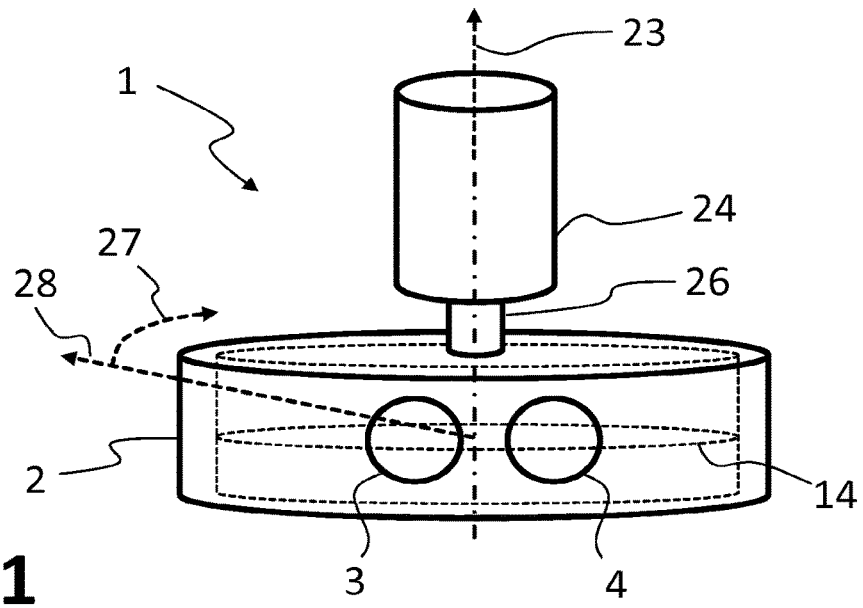
FIG. 1: shows a three-dimensional view of a described pump.

FIG. 1 shows a three-dimensional view of the pump 1. For the description of the pump 1 in spatial terms, a geometric axis 23 is defined. For the description of the spatial arrangement of the pump, a radial direction 28 and a circumferential direction 27 are also illustrated. The pump 1 has a pump housing 2 with an inlet 3 and an outlet 4. The drive 24 of the pump 1 is arranged above the pump housing 2 along the geometric axis 23, which drive 24 is connected via a drive shaft 26 to the eccentric (not illustrated here) in the pump housing 2. Also defined is a central plane 14 in which the pump housing 2 and the eccentric (not illustrated here) are situated and which preferably forms a plane of symmetry at least for the pump housing 2 and the eccentric.

Figure 2:
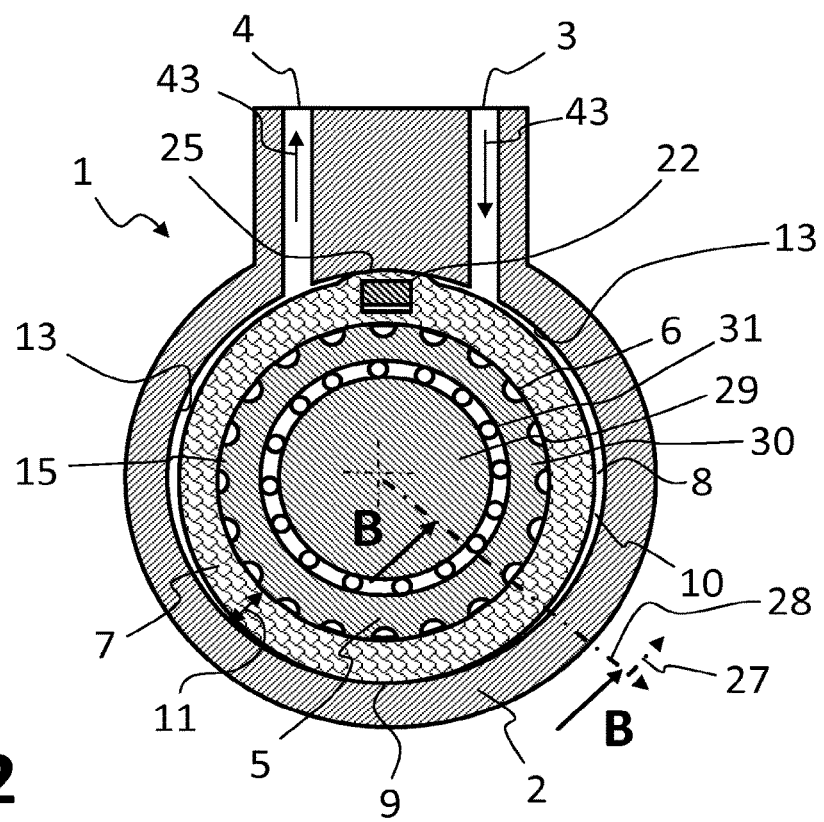
FIG. 2: shows a section through a described pump along a central plane.

FIG. 2 shows a section through the pump illustrated in FIG. 1 along the central plane 14 illustrated in FIG. 1. For orientation, the circumferential direction 27 and the radial direction 28 are illustrated in FIG. 2. The figure shows the pump housing 2 with the inlet 3 and the outlet 4. Situated in the pump housing 2 is the eccentric 5, which has an inner eccentric region 29, an outer bearing ring 30 and a bearing 31. Between the eccentric 5 and the pump housing 2 there is a pump gap 11, the width of which can be varied (in each case locally) by the eccentric movement of the eccentric 5. The pump gap 11 is formed in particular between an inner circumferential face 13 of the pump housing 2 and an outer face 6 of the eccentric 5.

An (annular) deformable element 7 is arranged in the pump gap 11. The delivery duct 8 is formed in the pump gap 11, between the deformable element 7 and the pump housing 2. Because of the eccentricity of the eccentric 5, a displaceable seal 9 is formed at which the deformable element bears directly against the pump housing 2 and the delivery duct 8 is thus blocked. The displaceable seal 9 divides the delivery duct 8 into displaceable pump volumes 10. The displaceable seal 9 is in particular formed by virtue of the deformable element 7 bearing against the inner circumferential face 13 of the pump housing 2. The pump 1 furthermore has a static seal 25 of the delivery duct 8. Here, the static seal 25 is formed by virtue of the deformable element 7 being clamped to the pump housing 2, by means of a pin 22, between the outlet 4 and the inlet 3. No liquid can pass through the static seal 25 between the pump housing 2 and the deformable element 7. The static seal 25 thus prevents a back flow of liquid along the delivery duct 8 from the outlet 4 to the inlet 3. The liquid is delivered through the delivery duct 8 in a delivery direction 43 as a result of an eccentric movement of the eccentric 5. The delivery direction 43 is reversed by means of a reversal of the direction of the eccentric movement. The outer face 6 of the eccentric 5 has a structured surface 15, such that the eccentric 5 bears against the deformable element 7, or presses against the deformable element 7, only in regions.

Figure 3:
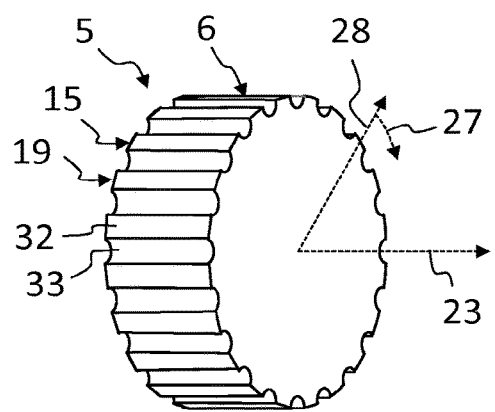
FIG. 3: shows an eccentric for a described pump.

FIG. 3 illustrates the eccentric 5 of the deformable element with the outer face 6 in a three-dimensional view. The outer face 6 has, as a structured surface 15, an undulation 19 with undulation peaks 32 and undulation troughs 33. For orientation, the geometric axis 23, the radial direction 28 and the circumferential direction 27 are also illustrated in FIG. 3.

Figure 4:
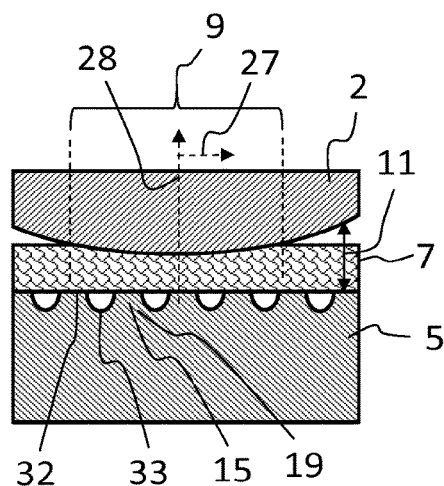
FIG. 4: is a functional illustration of a displaceable seal of the described pump.

FIG. 4 is a functional illustration of a displaceable seal 9 of the pump described here. The illustration of FIG. 4 corresponds to a conversion of the actually curved delivery duct into a linear illustration.

The illustration shows the pump housing 2, the eccentric 5 and the deformable element 5 arranged in between. For orientation, the radial direction 28 and the circumferential direction 27 are indicated by arrows. The eccentric 5 has, on its outer face 6, a structured surface 15 in the form of a profile with an undulation 19 with undulation peaks 32 and undulation troughs 33.

Figure 5:
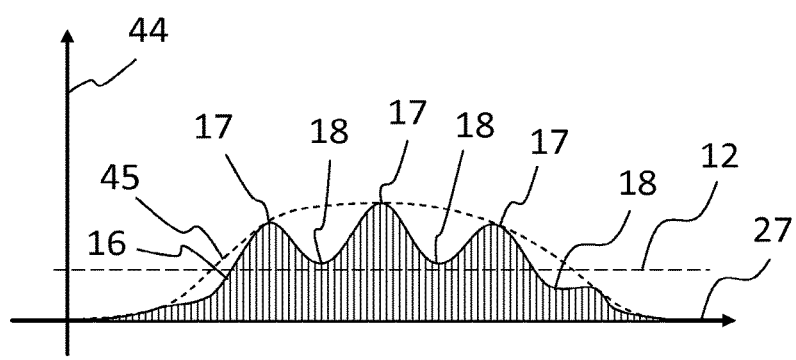
FIG. 5: shows a pressure distribution in a deformable element in the region of a displaceable seal of the described pump.

FIG. 5 illustrates, in a diagram, a pressure distribution 16 such as arises in the deformable element at the displaceable seal 9 as per FIG. 4 owing to the structured surface of the eccentric. The vertical axis of the diagram is a pressure axis 44, on which the pressure is plotted. The horizontal axis of the diagram corresponds to the circumferential direction 27. The diagram shows a theoretical pressure distribution 45 that would arise in the deformable element in the region of the displaceable seal owing to the eccentricity of the eccentric if the eccentric did not have a structured surface. Owing to the structured surface, the actual pressure distribution 16 deviates from the theoretical pressure distribution 45. Pressure minima 18 exist in the deformable element in the region of undulation troughs of the structured surface which is formed as an undulation, whereas pressure maxima 17 exist in the region of the undulation peaks of the structured surface which is formed as an undulation. Also illustrated in the diagram in FIG. 5 is the operating pressure 12. It can be seen that the pressure minima 18 are higher than the operating pressure 12.

FIGS. 6, 7, 8 and 9 each show outer faces 6 for eccentrics 5, wherein linear embodiments corresponding to FIG. 4 have been selected in each case for the illustrations. The outer face 6 of the eccentric 5 in FIGS. 6, 7, 8 and 9 has a structured surface 15 in each case.

Figure 6:
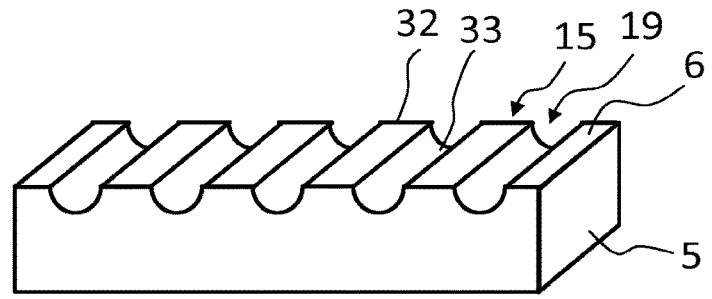
FIG. 6: shows a first design variant of an outer face of the eccentric in a described pump.

In FIG. 6, the structured surface 15 is formed as an undulation 19 with undulation peaks 32 and undulation troughs 33, wherein the undulation troughs 33 are each realized as channels with semicircular cross section.

Figure 7:
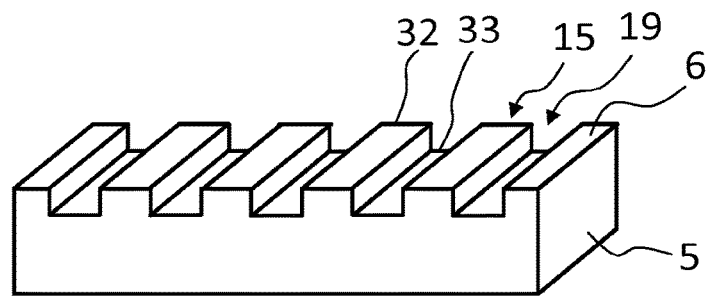
FIG. 7: shows a second design variant of an outer face of the eccentric in a described pump.

FIG. 7 shows a structured surface 15 as an undulation 19 with undulation peaks 32 and undulation troughs 33, wherein the undulation troughs 33 and the undulation peaks 32 are in each case of rectangular form.

Figure 8:
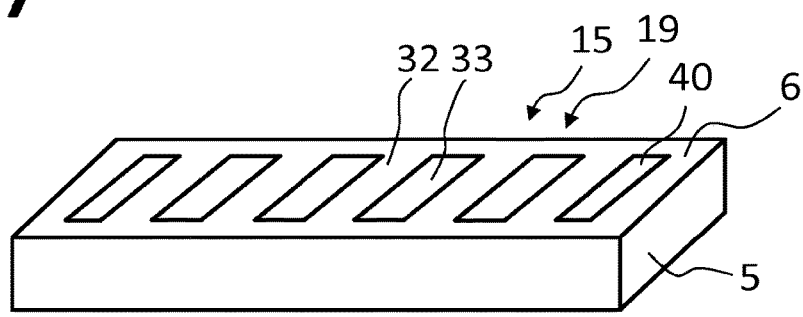
FIG. 8: shows a third design variant of an outer face of the eccentric in a described pump.

FIG. 8 shows a structured surface 15 which is designed as an undulation 19 and which likewise has undulation peaks 32 and undulation troughs 33, wherein, in FIG. 8, the undulation troughs 33 are in each case axially delimited. The undulation troughs 33 thus simultaneously also form depressions 40 in the outer face 6 of the eccentric 5.

Figure 9:
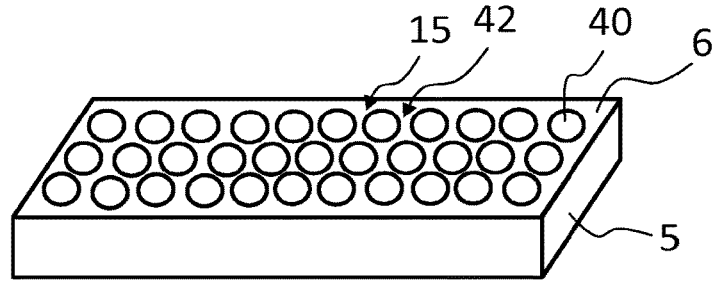
FIG. 9: shows a fourth design variant of an outer face of the eccentric in a described pump.

FIG. 9 shows a structured surface 15 which can also be referred to as a golf ball surface 42 and which comprises regularly arranged, preferably (hemi)spherical depressions 40 in the outer face 6 of the eccentric 5.

Figure 10:
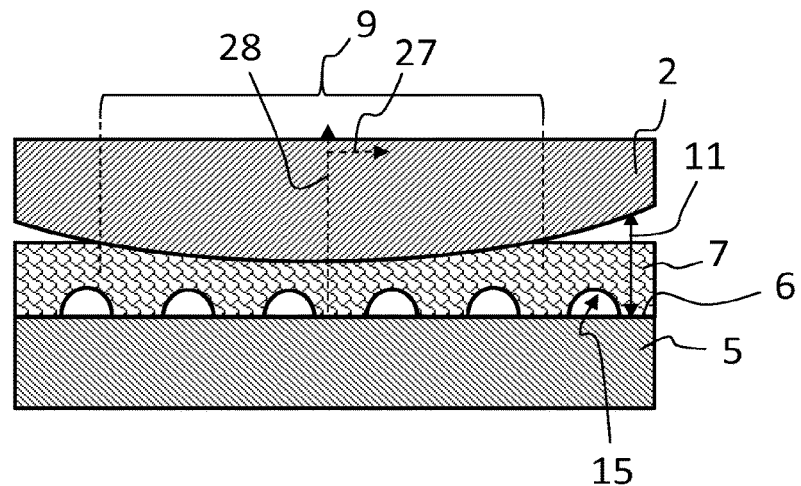
FIG. 10: is a functional illustration of a static seal in a further design variant of a described pump.
Figure 11:
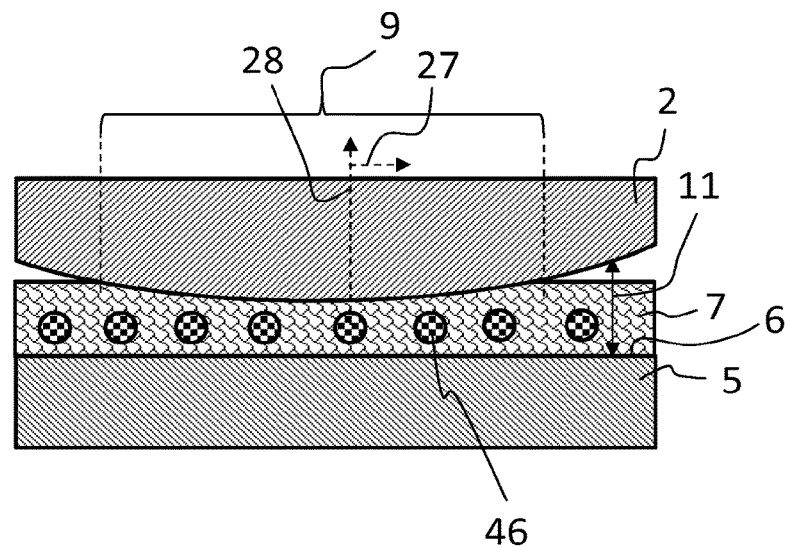
FIG. 11: is a functional illustration of a static seal in a yet further design variant of a described pump.

FIGS. 10 and 11 explain further or alternative design variants of a pump which are very similar to the pump described here. The design features described here for the pump (in particular the design features claimed in the subclaims) can be transferred analogously to the alternative design variants of a pump explained in FIGS. 10 and 11. The alternative design variants described in FIGS. 10 and 11 can be used instead of a structured surface of the outer face 6 of the eccentric 5. The design variants specified in FIGS. 10 and 11 are in particular also intended to be described here independently of the claimed design variant of the pump, and may possibly be pursued within the context of divisional applications.

FIGS. 10 and 11 each show the pump housing 2, the eccentric 5 and the deformable element 7 correspondingly to the illustration in FIG. 4. For orientation, the radial direction 28 and the circumferential direction 27 are marked. The figures show the pump gap 11 between the pump housing 2 and the eccentric 5, in which pump gap the deformable element 7 is arranged. At the displaceable seal 9, the deformable element 7 is pressed against the pump housing 2 by the eccentric 5.

In FIG. 10, instead of a structured surface 15 on the outer face 6 of the eccentric, a structured surface 15 is formed on that side of the deformable element 7 which faces toward the outer face 6. Any of the variants illustrated in FIGS. 6, 7, 8 and 9 may be selected for said structured surface 15. By means of such a structured surface 15 on the deformable element 7, a pressure distribution in the deformable element 7 can be obtained which corresponds to that in FIG. 5.

In FIG. 11, instead of a structured surface, inserts 46 are arranged in regions in the deformable element 7. Said material inserts 46 may be arranged in a regular pattern, which corresponds for example to a pattern from one of FIG. 6, 7, 8 or 9. By means of said inserts 46, it is likewise possible for a pressure distribution corresponding to FIG. 5 to be realized in the deformable element 7.

Figure 12:
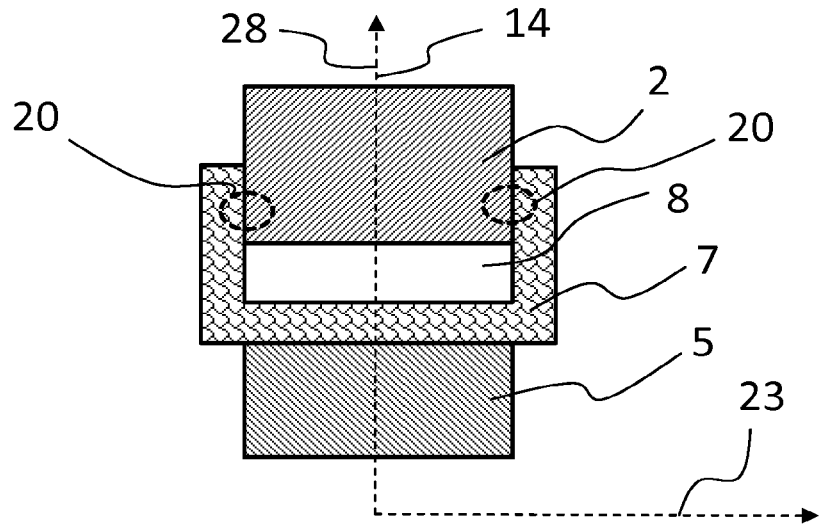
FIG. 12: shows a section through a described pump.

FIG. 12 shows a section through a described pump of arbitrary type along the section direction B-B from FIG. 2. The radial direction 28 and the geometric axis 23 of the pump are shown.

The illustration shows in particular the pump housing 2, the eccentric 5 and the deformable element 7. FIG. 12 shows the annular axial seals 20 that are formed, on both sides of the delivery duct 8, between the pump housing 2 and the deformable element 7 in order to seal off the delivery duct 8 (axially) on both sides. Said annular axial seals 20 may for example be realized by clamping and/or adhesive bonding of the deformable element 7 to the pump housing 2.

Figure 13:
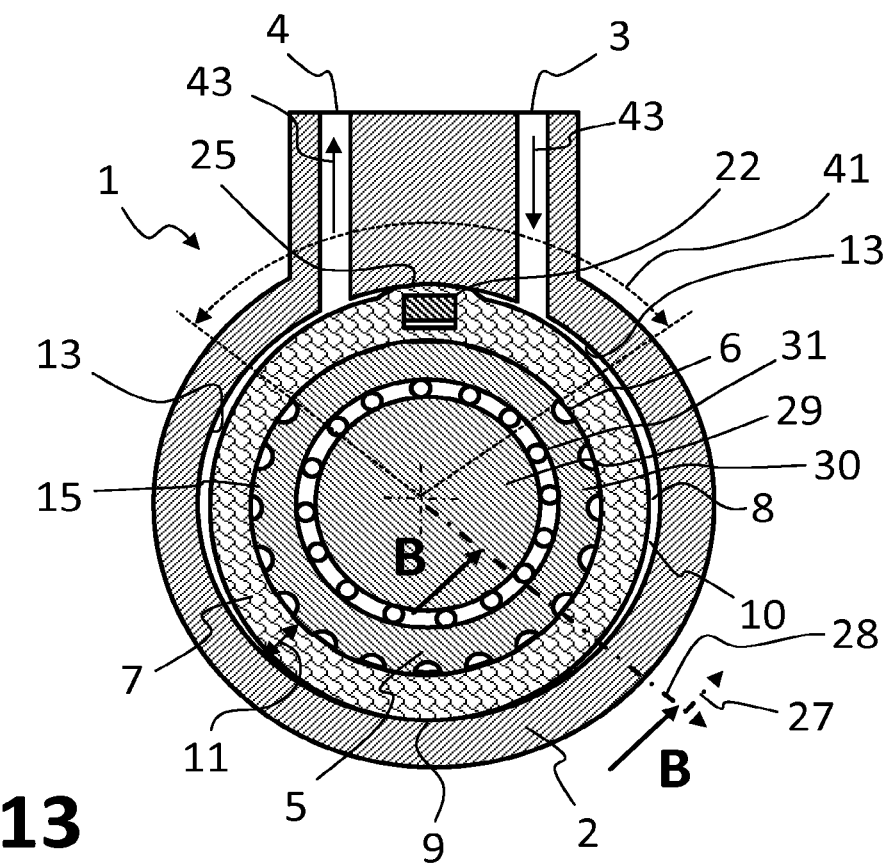
FIG. 13: shows a section through a particular design variant of the described pump along the central plane.

FIG. 13 shows a section through a pump 1, which corresponds to the section through a pump 1 illustrated in FIG. 2. The outer face 6 of the eccentric 5 of the pump 1 from FIG. 13 additionally has an angle segment 41 which does not have a structured surface 15. Said angle segment 41 is arranged so as to face the inlet 3 and the outlet 4, such that the angle segment 41 covers the inlet 3 and the outlet 4.

Figure 14:
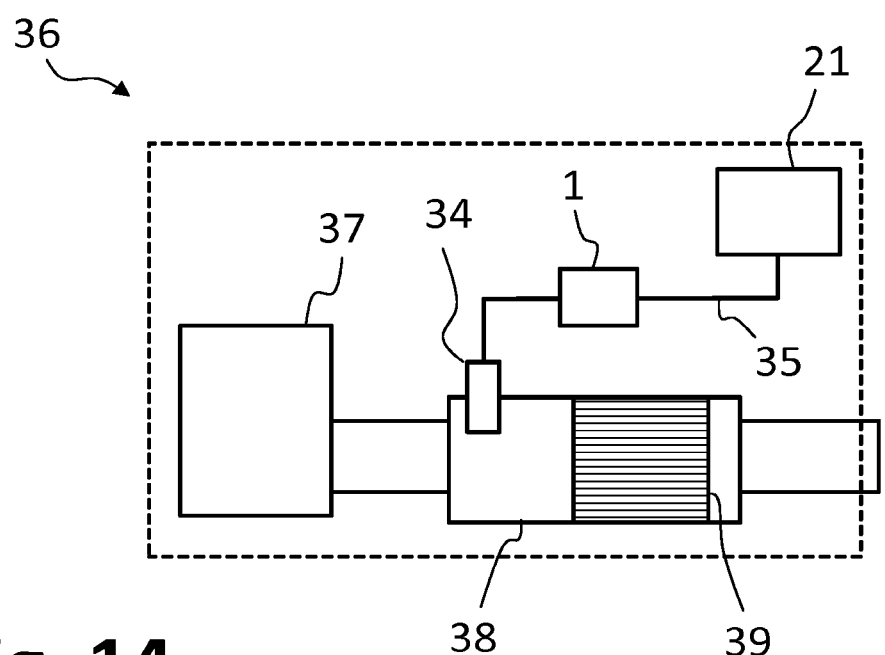
FIG. 14: shows a motor vehicle having a described pump.

FIG. 14 shows a motor vehicle 36 having an internal combustion engine 37 and having an exhaust-gas treatment device 38 for the purification of the exhaust gases of the internal combustion engine 37. In the exhaust-gas treatment device 38 there is arranged an SCR catalytic converter 39 by means of which exhaust gases of the internal combustion engine 37 can be purified by means of the process of selective catalytic reduction. On the exhaust-gas treatment device 38 there is arranged an injector 34 to which liquid for exhaust-gas purification can be supplied from a tank 21 by means of a described pump 1. For this purpose, the tank 21, the pump 1 and the injector 34 are connected to one another via a line 35.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A pump for delivering a liquid, comprising:
   at least one pump housing having at least one inlet and at least one outlet;
   an inner circumferential face, the inner circumferential face being part of the at least one pump housing;
   a geometric axis extending through the at least one pump housing;
   an eccentric having an outer face, the eccentric being arranged within the pump housing such that the eccentric is movable in eccentric fashion relative to the pump housing about the geometric axis;
   a structured surface formed as part of the outer face, the structured surface further comprising:
      a pattern of depressions integrally formed on the outer face, wherein the depressions are delimited in encircling fashion;
   a deformable element arranged in a pump gap between the inner circumferential face of the pump housing and the outer face of the eccentric; and
   a delivery duct in fluid communication with the at least one inlet and the at least one outlet, the delivery duct being located between the deformable element and the inner circumferential face of the pump housing;
   wherein the deformable element is pressed against the pump housing along at least one section of the delivery duct by the outer face of the eccentric such that at least one displaceable seal of the delivery duct and at least one closed pump volume are formed in the delivery duct, the at least one displaceable seal and the at least one closed pump volume being displaceable along the delivery duct from the inlet to the outlet by eccentric movement of the eccentric for the delivery of the liquid.

2. The pump of claim 1, the deformable element further comprising: a pressure distribution formed by the structured surface in the area of the displaceable seal, the pressure distribution having at least one local pressure maximum and at least one local pressure minimum located along the delivery duct.

3. The pump of claim 2, wherein the structured surface is shaped such that the pressure in the deformable element at the local pressure minimum is higher than a predetermined maximum operating pressure of the pump.

4. The pump of claim 1, further comprising:
   an outer bearing ring, the outer face having the structured surface being formed on the outer bearing ring;
   an inner eccentric region; and
   a bearing located between the outer bearing ring and the inner eccentric region;
   wherein eccentric rotational movement of the inner eccentric region is converted into eccentric circulating movement of the outer bearing ring.

5. The pump of claim 4, wherein the outer bearing ring of the eccentric is rotationally fixed relative to the pump housing.

6. The pump of claim 1, wherein the structured surface of the outer face of the eccentric further comprises a smooth angle segment about the geometric axis, wherein the smooth angle segment covers at least the inlet or the outlet.

7. The pump of claim 1, further comprising:
   an internal combustion engine; and
   an exhaust-gas treatment device for the purification of the exhaust gases of the internal combustion engine;
   wherein the pump is designed to deliver a liquid additive for exhaust-gas purification from a tank to an injector, by means of which the liquid additive is supplied to the exhaust-gas treatment device.

* * * * *